E. HARTER.
Horse Hay Fork.
No. 89,478.
Patented April 27, 1869.
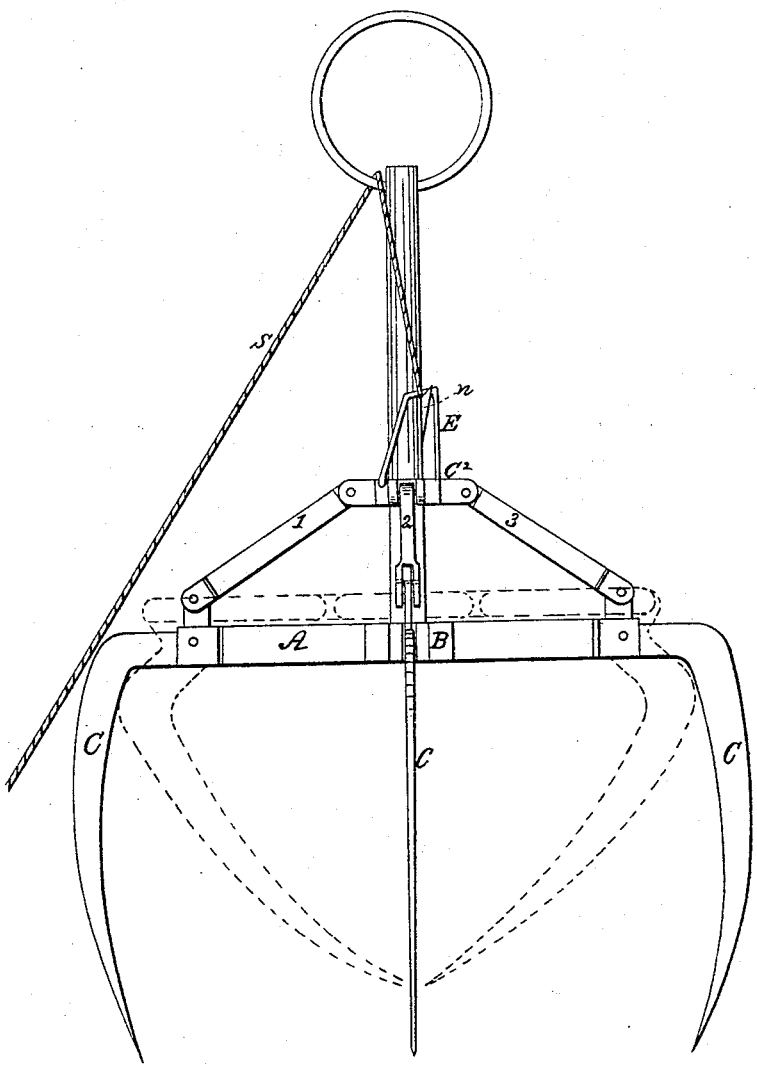
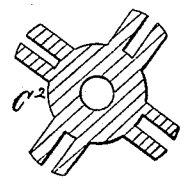

ELAM HARTER, OF DOWAGIAC, MICHIGAN.

Letters Patent No. 89,478, dated April 27, 1869.

IMPROVEMENT IN HORSE HAY-FORKS.

The Schedule referred to in these Letters Patent and making part of the same.

*To all whom it may concern:*

Be it known that I, ELAM HARTER, of Dowagiac, in the county of Cass, and State of Michigan, have invented a new and useful Improvement in Horse Hay-Forks; and I do hereby declare that the following is a full, clear, and exact description of the construction and operation of the same, reference being had to the accompanying drawing, making a part of this specification, in which—

Figure 1 is a side view, and

Figure 2, a detached section.

The nature of my invention consists in constructing a horse hay-fork with its tines so arranged as to take hold of a great amount of surface hay, and is particularly adapted to handling short hay and straw, and is cheap, strong, and durable.

To enable others skilled in the art to make and use my invention, I will proceed to describe its construction and operation.

In the accompanying drawings,

A represents a fork-head, constructed with four horizontal arms, radiating from the hub B, and are set equal distance apart, and of convenient length, having suitable tines C C C C pivoted to the outer ends of said arm.

The points of the tines curve inward, and meet in the centre. When in position for its load the upper ends of said tines extend a little above the point where they are pivoted to the arms, and are pivoted to the outer ends of the horizontal braces 1, 2, 3, 4. The inner ends of said braces are pivoted to the short arms on the cross-head $C^2$. Said cross-head fits loosely on the hoisting-stem D.

It will be seen that the weight of the hay on the fork will cause an inward pressure on the outer ends of the braces, causing a corresponding pressure on the opposite sides of the cross-head, but when the point, where the braces are pivoted to the cross-head, is below the line of the centre of their outer-end bearings, the tines are held rigidly in their position, with the cross-head resting upon the hub B; and when the cross-head is drawn up, by means of the trip-cord S, above the said line, the action of the braces serves to throw it still higher, allowing the tines to swing apart, and drop their load.

It will also be seen that this arrangement of the fork-head will admit of placing the tines a greater distance apart than is commonly done, thus taking hold of surface hay, and that it does not require to be set deep in the hay.

One great disadvantage with horse hay-forks is that they do not take their load from the surface, but must be set deep in the hay, and the hay taken by the forks has to be drawn out from under other hay, frequently requiring the full power of the horse to move a quantity of hay far less than a load for him when separated from other hay with which it is encumbered. This disadvantage, I believe, is mostly obviated by my arrangement of a fork.

E represents a bail attached to the cross-head $C^2$, to which the trip-cord is fastened.

$x$ represents a catch, into which the bail drops when the load is discharged from the fork, holding the cross-head up, and the tines in position to enter the hay for the next load. When the bail is disengaged from the catch, and the fork pressed into the hay, the inward curve of the points of the tines draws them together. As they penetrate the hay, the cross-head drops upon the hub, making the braces self-setting.

Having thus fully described my invention,

What I claim as new, and desire to secure by Letters Patent, is—

In combination with the fork-head A, the cross-head C, with its braces 1, 2, 3, 4, the bail E, and catch $x$, when constructed, arranged, combined, and operated as set forth.

ELAM HARTER.

Witnesses:
S. H. WHEELER,
C. T. LEE.